United States Patent [19]

Courtney

[11] Patent Number: 5,704,131
[45] Date of Patent: Jan. 6, 1998

[54] ADJUSTABLE PLUMB BOB AND LINE CAPABLE OF AUTOMATIC BRAKING AND RETRACTION

[76] Inventor: Mick Courtney, 311 W. Main St., Enterprise, Oreg. 97828

[21] Appl. No.: 643,737

[22] Filed: May 6, 1996

Related U.S. Application Data

[63] Continuation-in-part of Ser. No. 274,221, Jul. 13, 1994, abandoned.

[51] Int. Cl.$^6$ .................................................. G01C 15/10
[52] U.S. Cl. ........................... 33/394; 242/381.1; 33/413
[58] Field of Search ............................ 33/413, 414, 339, 33/392, 394, 393, 767, 756; 242/381.1, 381.3, 417.2

[56] References Cited

U.S. PATENT DOCUMENTS

| | | | |
|---|---|---|---|
| 486,604 | 11/1892 | Porter | 242/381.1 |
| 642,888 | 2/1900 | Van Vliet | 33/353 |
| 2,384,914 | 9/1945 | Hoagland | 33/393 |
| 2,637,913 | 5/1953 | Williams | 33/393 |
| 3,016,616 | 1/1962 | Matson | 33/393 |
| 3,172,205 | 3/1965 | Gammon | 33/394 |
| 3,284,914 | 11/1966 | Kruse | 33/394 |
| 3,568,322 | 3/1971 | Showers | 33/413 |
| 4,660,291 | 4/1987 | Dehn | 33/414 |
| 4,697,349 | 10/1987 | Lee | 33/414 |
| 4,926,562 | 5/1990 | Hwu | 33/414 |

FOREIGN PATENT DOCUMENTS

| | | | |
|---|---|---|---|
| 2818346 | 11/1979 | Germany | 33/394 |
| 282416 | 11/1989 | Japan | 33/393 |
| 389257 | 7/1965 | Switzerland | 33/394 |

Primary Examiner—Thomas B. Will

[57] ABSTRACT

A plumb bob apparatus for locating verticals with a line capable of automatic braking and retraction comprising a substantially square hollow housing wherein a spring loaded spool, in combination with an adjustable tension and braking device, allow a plumb bob weight to be manually extended by a string or flexible member to any length where the plumb bob weight will remain until retraction is effected. The preferred embodiment of the plumb bob apparatus also possesses a pin-tipped plunger, a notch, and a magnetic strip for attachment of the apparatus to a variety of upper reference points to which the standard plumb bob apparatus would not otherwise be capable of attachment and use.

6 Claims, 1 Drawing Sheet

ADJUSTABLE PLUMB BOB AND LINE CAPABLE OF AUTOMATIC BRAKING AND RETRACTION

This is a continuation-in-part of application Ser. No. 08/274,221, filed Jul. 13, 1994, now abandoned.

FIELD OF THE INVENTION

The present invention relates to assemblies for a plumb bob and line, more particularly to plumb bob assemblies with a line capable of braking and retraction.

1. Background Plumb bob devices are commonly utilized in obtaining verticals for the proper erection of structures and in a variety of other contexts requiring accurate vertical placement.

Plumb bobs known in prior art generally entail the use of a string or other flexible member on which there is suspended a weight with a downwardly tapered point on the lower end.

In use, the weight is suspended with the flexible member extended from an upper reference point. The weight oscillates until coming to rest such that the pointer on the weight indicates the vertical on a lower reference.

2. Prior Art

Plumb bob devices having a line capable of braking and retraction are well known in the prior art. The following U.S. Pat. Nos. are illustrative of the state of the art in the field of the invention:

Wilbur, 932,218, Aug. 24, 1909 for a Reel. The line for a plumb bob is wound on a reel spool 18. A brake shoe is pressed against the periphery or head 20 of the spool by action of a spring 23. To release the brake alone, a trigger-like button 17 is pressed to compress the spring 23 further and release the brake shoe 18 from engagement with the head 20 permitting the line to be payed out or wound in.

Burns, 1,043,293, Nov. 5, 1912, for Plumb Bob. The bob line is wound upon a reel 7. A brake-ring 15 is actuated by a spring 20 to brake the reel 7. When pay out is desired, a button 21 is pressed to compress the spring and release the reel.

O'Loughlin, 1,571,667, Feb. 2, 1926, for Plumb Bob Carrier. A plumb carrier winds the cord of the plumb upon a reel mounted on a shaft 24 journaled in bearings. A spiral spring 25 within the reel causes winding of the cord when dogs 27 are in disengagement with cams 26, and when engaged halt the reel, as in windowshade operation.

Spaeth et al., 1,876,473, Sept. 6, 1932, for Plumb Bob and Chalk Line. A plumb bob contains a reel on which, by means of an external handle, the line is wound inside the bob to a desired length.

Hoagland, 2,384,917, Sept. 19, 1945, for Plumb Bob Line and Reel. The reel container may be fastened to a wall. A set screw 20 may be applied against a flange 2a of the reel 2 in order to hold the line from payout.

Worden, 2,492,609, Dec. 27, 1949, for Brake for Plumb Bob Reels. A plumb bob 15 is reeled upon a reel 13. The handle 20 of the reel may fold inwardly for insertion in the open end of hub 10 of the reel to expand fingers 12 into tight fitting frictional engagement with the hub.

Landon et al., 2,589,500, March 18, 1952, for Combined Chalk Line Box and Plumb Bob. A crank 27 with a handle 48 reels in or pays out the line for a combined plumb bob and case. The crank handle 49 locks in an opening in the case when the device is not in use.

Williams, 2,637,913, May 12, 1953, for Plumb Bob Carrier. A slidable latch 41 engages the reduced neck 44 of a plumb bob in storage so that the bob is secured against or in a container for the line. The latch may be slid to release the neck and free the bob, allowing the line to be paid out.

Unger, 3,011,263, Dec. 5, 1962, for Plumb Bob Device. A reel or spool 3 is mounted rotably in a case 5 on a shaft 10. An operating crank 11 actuates the spool. Wells or sockets 12 in the case receive the handle 25 of the crank 11 for securing the reel or spool against rotation. There is no provision for distributing the line on the reel.

Matson, 3,016,606, Jan 16, 1962, for Combination Marking Line and Plumb Bob. A marking line 16 has one end fixed to the hub of a reel 3 enclosed in a container having a dye well for marking dye to be applied to the plumb line.

Bosco, 4,459,761, Jul. 17, 1984, for Retractable Plumb and Chalk Line. A crank arm at one end rotates a shaft 20 on which is wound the line of a plumb bob 12. A bell crank member 33 when retracted causes dog-engagement of lugs with the case to prevent unwinding of the line.

Plumb bob assemblies previously contemplated either do not include a means for braking and retracting the line or such means are cumbersome for requiring manual operation. In addition, those plumb bob assemblies in the prior art that do provide for a line capable of braking necessarily involve friction and excessive wear on the plumb bob line, a brake shoe-type device and/or spool head.

Further, most plumb bob devices heretofore contemplated are not specifically designed to overcome conditions presenting structural obstacles to normal use. Examples of such conditions include odd angles on an upper reference point, unexpected protrusions in adjacent surfaces which interfere with free suspension of the plumb bob weight and line, and upper reference surfaces on which the plumb bob line cannot be easily attached, such as metal or glass.

Such less-than-ideal conditions may render use of the conventional plumb bob difficult or impossible.

SUMMARY OF THE INVENTION

In view of the foregoing disadvantages inherent in the known types of plumb bob devices now present in the prior art, the present invention provides a plumb bob apparatus wherein the same utilizes an automatic braking and retracting mechanism in addition to a variety of specific structural advantages which enable the present invention to be used in conditions conventional plumb bob devices cannot accommodate.

The present invention is simple in design and composed of common, inexpensive materials; it is, therefore, conducive to a low cost of manufacture and sale to the consuming public. The subject plumb bob device is also designed such that parts are easily and inexpensively repaired or replaced for longer and more economical use.

The present invention is compact in size and, in its storage position, has no loose or dangling parts susceptible to damage; this invention is further designed to be of durable and reliable construction.

As such, the general purpose of the present invention, which will be described subsequently in greater detail, is to provide a new and improved plumb bob apparatus which has all the advantages of the prior art and none of the disadvantages.

To attain this, the present invention provides a plumb bob assembly including a durable, hollow case or housing, a spring-loaded spool device mounted inside the housing, and a length of string or other sufficiently flexible and strong member threadedly engaged with a unique tension and braking device.

One end of the flexible member is connected to and wound about the aforementioned spool device. The flexible member then passes through the tension and braking device before exiting the hollow casing through a slot which runs substantially the length of the base of the housing.

The other end of the flexible member is attached to the upper portion of a plumb bob weight, which, in the preferred embodiment, is composed of a high-density plastic and tapered at both ends. The plumb bob weight has a band of metal around its mid-section for added weight and a replaceable steel pointer on the lower tapered end for accurately indicating the vertical.

The present invention further discloses a plumb bob assembly equipped with a replaceable pin-tipped plunger for tacking the apparatus to a sufficiently pliable upper reference point surface; a notch for attaching the plumb bob apparatus to the edge of a glass plate or window; a magnet embedded in one side of the apparatus for attachment of the apparatus to and use of the apparatus on metallic surfaces; and an opening or slot running substantially the base of the apparatus. A pulley is situated at one end of said slot such that the plumb bob line can be draped over the pulley and the weight thereby suspended immediately adjacent to a vertical surface rather than the standard distance of two inches away from such surface.

My invention resides not in any one of these features, per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

OBJECTS AND ADVANTAGES

It is therefore an object of the present invention to provide a new and improved plumb bob apparatus which has all the advantages of the prior art plumb bob apparatus and none of the disadvantages.

It is also an object of the present invention to provide a new and improved plumb bob apparatus which features automatic line braking and retraction capability, without excessive wear on associated parts.

It is another object of the present invention to provide a new and improved plumb bob apparatus capable of accommodating structural conditions which would otherwise inhibit or preclude the use of a conventional plumb bob device.

It is a further object of the present invention to provide a new and improved plumb bob apparatus which may be easily and efficiently manufactured and marketed.

A still further object of the present invention is to provide a new and improved plumb bob apparatus of durable and reliable construction, with component parts susceptible to simple and economical repair or replacement.

Yet a further object of the present invention is to provide a new and improved plumb bob apparatus susceptible of a low cost of manufacture with regard to both materials and labor, and which accordingly is then susceptible of a low price of sale to the consuming public, thereby making such plumb bob apparatus economically available to the buying public.

Yet a further still object of the present invention is to provide a new and improved plumb apparatus that is of durable and reliable construction.

One further object of the present invention is to provide a new and improved plumb bob apparatus that is compact in size and, in its storage position, is free of loosely hanging parts susceptible to damage.

There, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other objects and advantages of the present invention will become more readily apparent after considering the following drawings and description.

DESCRIPTION OF THE DRAWINGS

The various objects, advantages, and novel features of the invention will be more readily understood from the following detailed description, in which like reference characters refer to like parts, and in which.

DETAILED DESCRIPTION OF PREFERRED EMBODIMENT

Embodiment of FIG. 1

Figure 1:
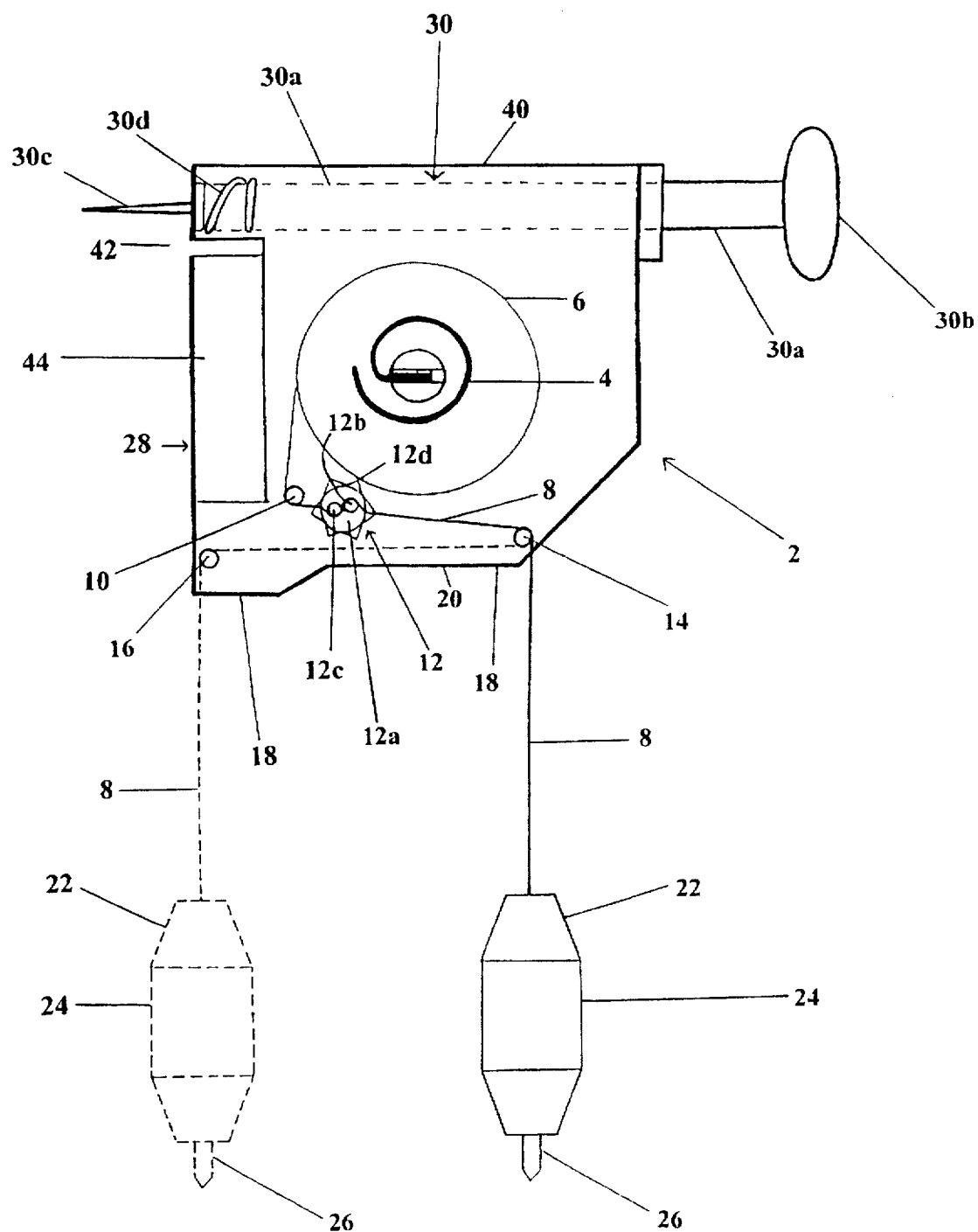
FIG. 1 is a side view of the preferred embodiment of the invention, with the plumb weight depicted in two different positions and the cover portion of the housing removed.

The plumb bob housing 2 comprises a two-part hollow body, detachably or hingably joined such that removal of the cover portion will fully reveal the internal assembly of the apparatus.

A coiled band spring 4 is wound inside the hollow housing 2 and is attached at one end to the inner surface of the housing 2. The other end of the band spring 4 is attached to a spool 6, such that rotation of the spool 6 in one direction will effect coiling of the band spring 4, while rotation of the spool 6 in the opposite direction will uncoil the spring 4.

One end of a long flexible member 8 is attached to and wound around the spool 6. The other end attached to a plumb bob weight 22 such that the tension on the flexible member 8 attributable to the coiled band spring 4 is substantially greater than the resistance presented by the suspended plumb bob weight 22. In its normal position when not in use, the flexible member 8 is wound around the spool 6 and the coiled spring is in a neutral status.

The flexible member 8, spool 6 and band spring 4 are associated such that extension of the flexible member 8 will cause rotation of the spool 6 and tightening of the coiled spring 4.

The flexible member 8 is threadedly engaged with pulley 10 in order to guide the flexible member 8 through the housing 2 and into a unique line tension and braking device 12.

The line tension and braking device 12 is comprised of a disc member 12a located inside the hollow housing 2 with pegs 12b and 12c set perpendicularly on a shared side of the disc 12a surface such that the flexible member 8 can be wound about pegs 12b and 12c with the flexible member 8 capable of moving freely therebetween.

An adjustment dial 12d is located on the external surface of the apparatus housing 2 and is connected to the disc member 12a such that rotation of the adjustment dial 12d will effect simultaneous rotation of the disc member 12a.

The external tension adjustment dial 12d has substantially the shape of a star, with pointed protrusions around the circumference at regular intervals. The adjustment dial 12d protrusions fix the adjustment dial 12d in position by fitting into an aperture in the housing having the same shape as the dial 12d.

When the tension device 12 is turned by way of the external adjustment dial 12d, the extent to which the flexible member 8 is bound up about pegs 12b and 12c is altered. When the flexible member is bound around pegs 12b and 12c at a wide angle the superior force of the coiled band spring 4 will automatically effect retraction of the plumb bob weight 22 upon extension from the apparatus.

However, when the flexible member 8 is bound about pegs 12b and 12c at a severe angle, the tension device 12 creates a state of equilibrium between the opposing forces presented by the coiled band spring 4 and plumb bob weight 22. While the superior force of the spring coil 4 would otherwise automatically retract the plumb bob weight 22 and flexible member 8 into the apparatus, this equilibrium status allows the flexible member 8 and plumb bob weight 22 to remain at the length to which manually extended, without automatic retraction by the coiled spring 8.

The tension on the flexible member 8 can be adjusted by way of the external adjustment dial 12d at any time, either before the plumb bob weight 22 is extended for use or after extension when it is apparent that line tension is not appropriate for user needs.

After passing through a second pulley 14, the flexible member 8 exits the housing 2 through a slot 18 which runs substantially the length of the housing base 20. The flexible member 8 will exit the housing 2 through the slot 18 at a location that is a predetermined distance away from the housing attachment side 28 in order to clear any extraneous obstacles that might be present on the housing attachment side 28 of the apparatus.

However, a third pulley 16 is mounted near the housing attachment side 28 of the slot 18 such that the flexible member 8 can be draped from pulley 14 over pulley 16, thereby allowing the plumb bob weight 22 to exit the housing 2 through the slot 18 at a location directly adjacent to the attachment side of the housing 28, rather than some predetermined distance away from the attachment side 28 of the housing 2.

The plumb bob weight 22 in the preferred embodiment is tapered on both ends and composed of a high-density plastic for economy and durability. The plumb bob weight 22 has a metallic band 24 around the midsection for additional weight and a steel tip pointer 26 on the lower tapered end for precise indication of the vertical to be located.

A plunger 30, comprised of a cylindrical shaft 30a, runs substantially the length of the housing 2 with one end extending through an aperture in the housing 2, that end having an over-sized, hollow handle 30b threadedly attached thereto and external to the housing 2. This hollow handle 30b is designed to be redatchable from the housing 2 and suitable for storing spare parts.

A replaceable tack pin 30c is perpendicularly attached to the end of the shaft 30a opposite the handle 30b, and is situated such that said pin 30c can exit through an aperture in the housing 2 when the plunger 30 is thrust forward by the handle 30b.

A spring 30d is seated between the internal housing 2 and pin-tipped end 30c of said cylindrical shaft 30a to effect retraction of the plunger 30 and pin 30c into the housing 2 when the plunger is in a neutral position.

In the preferred embodiment, the plunger 30 assembly is located near the top side 40 of the apparatus.

A right-angle notch 42 is set into the attachment side 28 of the apparatus such that the apparatus can be mounted for use on the edge of a sheet of plywood, window pane or similar structure.

A magnetic strip 44 is also embedded in the attachment side 28 of the apparatus, flush with the surface thereof, such that the apparatus can be mounted for use on a metallic surface.

The magnetic strip 44 can also be used to store the plumb bob weight 22 by attaching the metal band 24 on the plumb bob weight 22 to the magnetic strip 44. If the flexible member 8 is fully retracted into the housing 2 before attaching the plumb bob weight 22 to the magnetic strip 44 for storage purposes, the apparatus will be free of loose or dangling parts susceptible to damage.

OPERATION

In actual use, the plumb bob apparatus is set upon or mounted by way of the plunger tack pin 30c, right angle notch 42, or magnetic strip 44 to an upper reference point. Once mounted, the plumb bob weight 22 is manually pulled downward from the housing 2 toward a lower reference point, thereby unwinding a length of the flexible member 8 from its storage position on the spring-loaded spool 6.

At the commencement of use, the adjustment dial 12d is set such that the flexible member 8 is wound loosely about pegs 12b and 12c allowing the operator to manually pull with ease the flexible member 8 around or through the flexible member's 8 location intertwined between pegs 12b and 12c.

When the plumb bob weight 22 is released, the plumb bob weight 22 will remain in the position to which it was manually extended or will automatically retract toward the housing 2, depending on the adjustment of the tension and braking device 12.

Adjustment of the tension and braking device 12 can be effected at any time, either before or during use.

To increase tension on the flexible member 8, the tension adjustment dial 12d is manually lifted out of the housing 2 aperture in which it rests and rotated to bind up the flexible member 8 around pegs 12b and 12c. To reduce tension on the flexible member 8, the tension adjustment dial 12d is rotated in the opposite direction.

After rotation, the tension adjustment dial 12d is replaced in the housing 2 aperture in its rotated position where it is fixed and incapable of further rotation.

The operator them makes use of the vertical indicated by the steel pointer tip 26 at the lower tapered end of the plumb bob weight 22. The operator may alter the location from which the flexible member 8 exits the apparatus housing 2 by draping the flexible member from pulley 14 to pulley 16.

In order to effect retraction of the plumb bob weight 22 after use, the operator cradles the plumb bob weight 22 in his hand while lifting the plumb bob weight 22 toward the housing 2. In doing so, the operator upsets the state of equilibrium between the coiled band spring 4 and plumb bob weight 22 thereby allowing the coiled band spring 4 to effect retraction of the flexible member 8 back onto the spool 6 and into the housing 2. This method of retraction is only effective when the flexible member 8 is wound sufficiently loosely around pegs 12b and 12c.

In the alternative, retraction of the flexible member 8 and plumb bob weight 22 can be effected by lifting the adjustment dial 12d from its location in the housing 2 aperture and rotating the adjustment dial 12d so as to unbind the flexible member 8, similarly upsetting the state of equilibrium between the coiled band spring 4 and plumb bob weight 22, thereby allowing the coiled band spring 4 to effect retraction of the flexible member 8 back onto the spool 6 and into the housing 2.

I claim:

1. An assembly for a plumb bob and line capable of automatic braking and retraction comprising:

a substantially square, hollow, two-part housing, comprising a cover and a base, detachably or hingably joined and possessing walls with interior and exterior surfaces;

a coiled band spring attached at one end to one interior surface of the housing;

a spool attached to the opposite end of the band spring;

a long flexible member having one end attached to the spool and the opposite end attached to a tapered plumb bob weight;

a series of pulleys located within the housing through which the flexible member passes in order to guide the flexible member through the housing;

a tension device through which the flexible member is thread, comprising in combination:

two pegs mounted perpendicularly on a shared surface of a disc member with the pegs extending into the hollow of the housing and located in relation to one another such that the flexible member can be wound about each peg; and an adjustment dial, having substantially the shape of a star, attached in parallel relation to the disc member and located on an exterior surface of the housing, such that rotation and setting of the adjustment dial will cause corresponding rotation and setting of the disc member;

an aperture in the housing having the same shape as the adjustment dial such that the adjustment dial can be rotated and placed in the aperture, thereby setting and maintaining the adjustment dial position;

a slot in the housing running substantially the length of the housing and through which the flexible member exits the housing.

2. An apparatus as set forth in claim 1 wherein said plumb bob weight includes a weight with a metallic band around the midsection and a replaceable steel tip pointer on the lower end thereof.

3. An apparatus as set forth in claim 1 including a retractable pin-tipped plunger comprising:

a shaft located inside and running substantially the length of the housing with one end extending through an aperture in said housing;

a handle on the end of the shaft external to the housing;

a replaceable pin perpendicularly attached to the end of the shaft opposite the handle and situated in relation to an aperture in the housing such that the pin exits the housing when the plunger is thrust forward by the handle; and a spring between the internal housing surface and pin-tipped end of the plunger shaft to effect retraction of the plunger and pin into the housing when the plunger is in a neutral position.

4. An apparatus as set forth in claim 3 wherein said handle is hollow and threadedly engaged with the plunger shaft such that spare parts for the apparatus may be stored therein.

5. An apparatus as set forth in claim 1 including a right angle notch in one side of the housing such that the apparatus can be mounted for use on the edge of a pane of window glass or similar structure.

6. An apparatus as set forth in claim 1 including a magnetic strip embedded flush in one side of the housing such that the apparatus can be mounted for use metallic surface.

* * * * *